United States Patent
Davis et al.

(10) Patent No.: US 11,231,858 B2
(45) Date of Patent: Jan. 25, 2022

(54) DYNAMICALLY CONFIGURING A STORAGE SYSTEM TO FACILITATE INDEPENDENT SCALING OF RESOURCES

(71) Applicant: Pure Storage, Inc., Mountain View, CA (US)

(72) Inventors: John Davis, San Francisco, CA (US); Robert Lee, San Carlos, CA (US)

(73) Assignee: Pure Storage, Inc., Mountain View, CA (US)

( * ) Notice: Subject to any disclaimer, the term of this patent is extended or adjusted under 35 U.S.C. 154(b) by 386 days.

(21) Appl. No.: 15/158,902

(22) Filed: May 19, 2016

(65) Prior Publication Data

US 2017/0337002 A1 Nov. 23, 2017

(51) Int. Cl.
- *G06F 3/06* (2006.01)
- *G06F 13/40* (2006.01)
- *G06F 13/42* (2006.01)

(52) U.S. Cl.
CPC .......... *G06F 3/0631* (2013.01); *G06F 3/0604* (2013.01); *G06F 3/067* (2013.01); *G06F 3/0629* (2013.01); *G06F 3/0653* (2013.01); *G06F 3/0683* (2013.01); *G06F 13/4022* (2013.01); *G06F 13/42* (2013.01)

(58) Field of Classification Search
CPC .... G06F 3/0631; G06F 3/0604; G06F 3/0683; G06F 13/4022; G06F 13/442
See application file for complete search history.

(56) References Cited

U.S. PATENT DOCUMENTS

| | | | |
|---|---|---|---|
| 5,390,327 | A | 2/1995 | Lubbers et al. |
| 5,479,653 | A | 12/1995 | Jones |
| 5,706,210 | A | 1/1998 | Kumano et al. |
| 5,799,200 | A | 8/1998 | Brant et al. |
| 5,933,598 | A | 8/1999 | Scales et al. |
| 6,012,032 | A | 1/2000 | Donovan et al. |
| 6,085,333 | A | 7/2000 | DeKoning et al. |

(Continued)

FOREIGN PATENT DOCUMENTS

| | | |
|---|---|---|
| EP | 0725324 A2 | 8/1996 |
| EP | 2164006 A2 | 3/2010 |

(Continued)

OTHER PUBLICATIONS

Kong, Using PCI Express as the Primary System Interconnect in Multiroot Compute, Communications and Embedded Systems, White Paper, IDT.com, 2008 [<URL://https://www.renesas.com/us/en/document/whp/idt-pcie-multi-root-white-paper>] (Year: 2008).*

(Continued)

*Primary Examiner* — David Yi
*Assistant Examiner* — Nicholas A. Paperno
(74) *Attorney, Agent, or Firm* — Womble Bond Dickinson (US) LLP

(57) ABSTRACT

A method for dynamically configuring a storage system to facilitate independent scaling of resources is provided. The method includes detecting a change to a topology of the storage system consisting of different sets of blades configured within one of a plurality of chassis and reconfiguring the storage system to change an allocation of resources to one or more authorities responsive to detecting the change to the topology of the storage system.

20 Claims, 9 Drawing Sheets

(56) References Cited

U.S. PATENT DOCUMENTS

| | | |
|---|---|---|
| 6,275,898 B1 | 8/2001 | DeKoning |
| 6,643,641 B1 | 11/2003 | Snyder |
| 6,643,748 B1 | 11/2003 | Wieland |
| 6,647,514 B1 | 11/2003 | Umberger et al. |
| 6,725,392 B1 | 4/2004 | Frey et al. |
| 6,789,162 B1 | 9/2004 | Talagala et al. |
| 6,985,995 B2 | 1/2006 | Holland et al. |
| 7,069,383 B2 | 6/2006 | Yamamoto et al. |
| 7,076,606 B2 | 7/2006 | Orsley |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,159,150 B2 | 1/2007 | Kenchammana-Hosekote |
| 7,162,575 B2 | 1/2007 | Dalal et al. |
| 7,334,124 B2 | 2/2008 | Pham et al. |
| 7,334,156 B2 | 2/2008 | Land et al. |
| 7,437,530 B1 | 10/2008 | Rajan |
| 7,493,424 B1 | 2/2009 | Bali et al. |
| 7,558,859 B2 | 7/2009 | Kasiolas |
| 7,613,947 B1 | 11/2009 | Coatney |
| 7,669,029 B1 | 2/2010 | Mishra et al. |
| 7,681,104 B1 | 3/2010 | Sim-Tang et al. |
| 7,681,105 B1 | 3/2010 | Sim-Tang et al. |
| 7,689,609 B2 | 3/2010 | Lango et al. |
| 7,730,258 B1 | 6/2010 | Smith |
| 7,743,191 B1 | 6/2010 | Liao |
| 7,743,276 B2 | 6/2010 | Jacobsen et al. |
| 7,757,038 B2 | 7/2010 | Kitahara |
| 7,778,960 B1 | 8/2010 | Chatterjee et al. |
| 7,814,272 B2 | 10/2010 | Barrall et al. |
| 7,814,273 B2 | 10/2010 | Barrall |
| 7,818,531 B2 | 10/2010 | Barrall |
| 7,827,351 B2 | 11/2010 | Suetsugu et al. |
| 7,827,439 B2 | 11/2010 | Matthew et al. |
| 7,870,105 B2 | 1/2011 | Arakawa et al. |
| 7,885,938 B1 | 2/2011 | Greene et al. |
| 7,886,111 B2 | 2/2011 | Klemm et al. |
| 7,899,780 B1 | 3/2011 | Shmuylovich et al. |
| 7,908,448 B1 | 3/2011 | Chatterjee et al. |
| 7,941,697 B2 | 5/2011 | Mathew et al. |
| 7,958,303 B2 | 6/2011 | Shuster |
| 7,971,129 B2 | 6/2011 | Watson |
| 8,010,485 B1 | 8/2011 | Chatterjee et al. |
| 8,010,829 B1 | 8/2011 | Chatterjee et al. |
| 8,020,047 B2 | 9/2011 | Courtney |
| 8,042,163 B1 | 10/2011 | Karr et al. |
| 8,046,548 B1 | 10/2011 | Chatterjee et al. |
| 8,051,361 B2 | 11/2011 | Sim-Tang et al. |
| 8,051,362 B2 | 11/2011 | Li et al. |
| 8,082,393 B2 | 12/2011 | Galloway et al. |
| 8,086,585 B1 | 12/2011 | Brashers et al. |
| 8,086,634 B2 | 12/2011 | Mimatsu |
| 8,086,911 B1 | 12/2011 | Taylor |
| 8,108,502 B2 | 1/2012 | Tabbara et al. |
| 8,117,388 B2 | 2/2012 | Jernigan, IV |
| 8,145,838 B1 | 3/2012 | Miller et al. |
| 8,145,840 B2 | 3/2012 | Koul et al. |
| 8,176,360 B2 | 5/2012 | Frost et al. |
| 8,244,999 B1 | 8/2012 | Chatterjee et al. |
| 8,271,700 B1 | 9/2012 | Annem et al. |
| 8,305,811 B2 | 11/2012 | Jeon |
| 8,315,999 B2 | 11/2012 | Chatley et al. |
| 8,327,080 B1 | 12/2012 | Der |
| 8,387,136 B2 | 2/2013 | Lee et al. |
| 8,402,152 B2 | 3/2013 | Duran |
| 8,412,880 B2 | 4/2013 | Leibowitz et al. |
| 8,437,189 B1 | 5/2013 | Montierth et al. |
| 8,465,332 B2 | 6/2013 | Hogan et al. |
| 8,473,778 B2 | 6/2013 | Simitci |
| 8,479,037 B1 | 7/2013 | Chatterjee et al. |
| 8,498,967 B1 | 7/2013 | Chatterjee et al. |
| 8,522,073 B2 | 8/2013 | Cohen |
| 8,527,544 B1 | 9/2013 | Colgrove et al. |
| 8,533,527 B2 | 9/2013 | Daikokuya et al. |
| 8,566,546 B1 | 10/2013 | Marshak et al. |
| 8,578,442 B1 | 11/2013 | Banerjee |
| 8,595,455 B2 | 11/2013 | Chatterjee et al. |
| 8,613,066 B1 | 12/2013 | Brezinski et al. |
| 8,620,970 B2 | 12/2013 | English et al. |
| 8,627,136 B2 | 1/2014 | Shankar et al. |
| 8,627,138 B1 | 1/2014 | Clark |
| 8,660,131 B2 | 2/2014 | Vermunt et al. |
| 8,700,875 B1 | 4/2014 | Barron et al. |
| 8,713,405 B2 | 4/2014 | Healey et al. |
| 8,751,463 B1 | 6/2014 | Chamness |
| 8,762,642 B2 | 6/2014 | Bates et al. |
| 8,762,793 B2 | 6/2014 | Grube et al. |
| 8,769,622 B2 | 7/2014 | Chang et al. |
| 8,775,858 B2 | 7/2014 | Gower et al. |
| 8,775,868 B2 | 7/2014 | Colgrove et al. |
| 8,788,913 B1 | 7/2014 | Xin et al. |
| 8,799,746 B2 | 8/2014 | Baker et al. |
| 8,800,009 B1 | 8/2014 | Beda, III et al. |
| 8,812,860 B1 | 8/2014 | Bray |
| 8,819,383 B1 | 8/2014 | Jobanputra et al. |
| 8,843,700 B1 | 9/2014 | Salessi et al. |
| 8,850,108 B1* | 9/2014 | Hayes ................ G06F 12/0246 711/103 |
| 8,850,288 B1 | 9/2014 | Lazier et al. |
| 8,850,546 B1 | 9/2014 | Field et al. |
| 8,856,593 B2 | 10/2014 | Eckhardt et al. |
| 8,862,847 B2 | 10/2014 | Feng et al. |
| 8,868,825 B1 | 10/2014 | Hayes |
| 8,874,836 B1 | 10/2014 | Hayes |
| 8,898,346 B1 | 11/2014 | Simmons |
| 8,898,383 B2 | 11/2014 | Yamamoto et al. |
| 8,898,388 B1 | 11/2014 | Kimmel |
| 8,909,854 B2 | 12/2014 | Yamagishi et al. |
| 8,918,478 B2 | 12/2014 | Ozzie et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,021,053 B2 | 4/2015 | Bernbo et al. |
| 9,025,393 B2 | 5/2015 | Wu |
| 9,053,808 B2 | 6/2015 | Sprouse |
| 9,058,155 B2 | 6/2015 | Cepulis et al. |
| 9,116,819 B2 | 8/2015 | Cope et al. |
| 9,117,536 B2 | 8/2015 | Yoon |
| 9,124,569 B2 | 9/2015 | Hussain et al. |
| 9,134,922 B2 | 9/2015 | Rajagopal et al. |
| 9,201,733 B2 | 12/2015 | Verma |
| 9,209,973 B2 | 12/2015 | Aikas et al. |
| 9,250,687 B1 | 2/2016 | Aswadhati |
| 9,250,823 B1 | 2/2016 | Kamat et al. |
| 9,300,660 B1 | 3/2016 | Borowiec et al. |
| 9,444,822 B1 | 9/2016 | Borowiec et al. |
| 9,507,532 B1 | 11/2016 | Colgrove et al. |
| 9,684,531 B2* | 6/2017 | Jacobs ................ H04L 43/0876 |
| 9,829,066 B2 | 11/2017 | Thomas et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0015581 A1* | 1/2004 | Forbes ................ H04L 67/1095 709/224 |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0039183 A1* | 2/2005 | Romero ................ G06F 9/5061 718/100 |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Vana Gundy et al. |
| 2006/0129817 A1 | 6/2006 | Borneman et al. |
| 2006/0161726 A1 | 7/2006 | Lasser |
| 2006/0174157 A1 | 8/2006 | Barrall et al. |
| 2006/0184760 A1 | 8/2006 | Fujibayashi et al. |
| 2006/0230245 A1 | 10/2006 | Gounares et al. |
| 2006/0239075 A1 | 10/2006 | Williams et al. |
| 2007/0022227 A1 | 1/2007 | Miki |

(56) References Cited

U.S. PATENT DOCUMENTS

| | | |
|---|---|---|
| 2007/0028068 A1 | 2/2007 | Golding et al. |
| 2007/0055702 A1 | 3/2007 | Fridella et al. |
| 2007/0079068 A1 | 4/2007 | Draggon |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0214194 A1 | 9/2007 | Reuter |
| 2007/0214314 A1 | 9/2007 | Reuter |
| 2007/0220227 A1 | 9/2007 | Long |
| 2007/0268905 A1 | 11/2007 | Baker et al. |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0155191 A1 | 6/2008 | Anderson et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2008/0295118 A1 | 11/2008 | Liao |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0268908 A1 | 10/2010 | Ouyang et al. |
| 2010/0325345 A1 | 12/2010 | Ohno et al. |
| 2010/0332754 A1 | 12/2010 | Lai et al. |
| 2011/0022812 A1* | 1/2011 | van der Linden .... G06F 9/5077 711/163 |
| 2011/0035540 A1 | 2/2011 | Fitzgerald et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2011/0302369 A1 | 12/2011 | Goto et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0198152 A1 | 8/2012 | Terry et al. |
| 2012/0226934 A1 | 9/2012 | Rao |
| 2012/0303675 A1* | 11/2012 | Antani ................ G06F 16/2255 707/802 |
| 2012/0303919 A1 | 11/2012 | Hu et al. |
| 2012/0311000 A1 | 12/2012 | Post et al. |
| 2012/0311557 A1 | 12/2012 | Resch |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0060884 A1 | 3/2013 | Bernbo et al. |
| 2013/0071087 A1 | 3/2013 | Motiwala et al. |
| 2013/0073894 A1 | 3/2013 | Xavier et al. |
| 2013/0124776 A1 | 5/2013 | Hallak et al. |
| 2013/0145447 A1 | 6/2013 | Maron |
| 2013/0151771 A1 | 6/2013 | Tsukahara et al. |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0040702 A1 | 2/2014 | He et al. |
| 2014/0046908 A1* | 2/2014 | Patiejunas ......... G06F 17/30008 707/687 |
| 2014/0047263 A1 | 2/2014 | Coatney et al. |
| 2014/0068224 A1 | 3/2014 | Fan et al. |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0136880 A1 | 5/2014 | Shankar et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2014/0380125 A1 | 12/2014 | Calder et al. |
| 2014/0380126 A1 | 12/2014 | Yekhanin et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0013492 A1 | 5/2015 | Anderson et al. |
| 2015/0149822 A1 | 5/2015 | Coronado et al. |
| 2015/0193169 A1 | 7/2015 | Sundaram et al. |
| 2015/0280959 A1 | 10/2015 | Vincent |
| 2015/0355970 A1 | 12/2015 | Hayes et al. |
| 2015/0362968 A1 | 12/2015 | Jurey et al. |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |

FOREIGN PATENT DOCUMENTS

| | | |
|---|---|---|
| WO | WO-02-13033 | 2/2002 |
| WO | WO-2008103569 A1 | 8/2008 |
| WO | WO-2012/087648 A1 | 6/2012 |
| WO | WO2013071087 A1 | 5/2013 |
| WO | WO-2014/110137 A1 | 7/2014 |
| WO | WO-2015/188014 A1 | 12/2015 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

PCMag. "Storage Array Definition". Published May 10, 2013. <http://web.archive.org/web/20130510121646/http://www.pcmag.com/encyclopedia/term/52091/storage-array>, 2 pages.

Google Search of "Storage array Define" on Nov. 4, 2015 for U.S. Appl. No. 14/725,278, Results limited to entries dated before 2012, 1 page.

Techopedia. "What is a disk Array". Published Jan. 13, 2012. <http://web.archive.org/web/20120113053358/http://www.techopedia.com/definition/1009/disk-array>, 1 page.

Webopedia. "What is a disk Array". Published May 26, 2011. <http://web/archive.org/web/20110526081214/http://www.webopedia.com/TERM/D/disk_array.html>, 2 pages.

(56) References Cited

OTHER PUBLICATIONS

Li et al., *Access Control for the Services Oriented Architecture*, Proceedings of the 2007 ACM Workshop on Secure Web Services (SWS '07), Nov. 2007, pp. 9-17, ACM New York, NY.

The International Search Report and the Written Opinion received from the International Searching Authority (ISA/EPO) for International Application No. PCT/US2016/015006, dated Apr. 29, 2016, 12 pages.

The International Search Report and the Written Opinion received from the International Searching Authority (ISA/EPO) for International Application No. PCT/US2016/015008, dated May 4, 2016, 12 pages.

C. Hota et al., *Capability-based Cryptographic Data Access Control in Cloud Computing*, Int. J. Advanced Networking and Applications, col. 1, Issue 1, dated Aug. 2011, 10 pages.

The International Search Report and the Written Opinion received from the International Searching Authority (ISA/EPO) for International Application No. PCT/US2016/020410, dated Jul. 8, 2016, 17 pages.

The International Search Report and the Written Opinion recieved from the International Searching Authority (ISA/EPO) for International Application No. PCT/US2016/032084, dated Jul. 18, 2016, 12 pages.

Faith, "Dictzip file Format", GitHub.com (online). [Accessed Jul. 28, 2015], 1 page, URL: https://github.com/fidlej/idzip.

Wikipedia, "Convergent Encryption", Wikipedia.org (online), accessed Sep. 8, 2015, 2 pages, URL: en.wikipedia.org/wiki/Convergent_encryption.

Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.

The International Search Report and the Written Opinion recieved from the International Searching Authority (ISA/EPO) for International Application No. PCT/US2016/016333, dated Jun. 8, 2016, 12 pages.

ETSI, *Network Function Virtualisation (NFV); Resiliency Requirements*, ETSI GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.

The International Search Report and the Written Opinion received from the International Searching Authority (ISA/EPO) for International Application No. PCT/US2016/032052, dated Aug. 30, 2016, 17 pages.

Microsoft, "Hybrid for SharePoint Server 2013—Security Reference Architecture", <http://hybrid.office.com/img/Security_Reference_Architecture.pdf> (online), dated Oct. 2014, 53 pages.

Microsoft, "Hybrid Identity", <http://aka.ms/HybridIdentityWp> (online), dated Apr. 2014, 36 pages.

Microsoft, "Hybrid Identity Management", <http://download.microsoft.com/download/E/A/E/EAE57CD1-A80B-423C-96BB-142FAAC630B9/Hybrid_Identity_Datasheet.pdf> (online), publised Apr. 2014, 17 pages.

Jacob Bellamy-McIntyre et al., "OpenID and the Enterprise: A Model-based Analysis of Single Sign-on Authentication", 2011 15th IEEE International Enterprise Distributed Object Computing Conference (EDOC), DOI: 10.1109/EDOC.2011.26, ISBN: 978-1-4577-0362-1, <https://www.cs.ackland.ac.nz/~lutteroth/publications/McIntyreLutterothWeber2011-OpenID.pdf> (online), dated Aug. 29, 2011, 10 pages.

The International Search Report and the Written Opinion received from the International Searching Authority (ISA/EPO) for International Application No. PCT/US2016/035492, dated Aug. 17, 2016, 10 pages.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/036693, dated Aug. 29, 2016.

International Search Report and Written Opinion, PCT/US2016/038758, dated Oct. 7, 2016.

International Search Report and Written Opinion, PCT/US2016/040393, dated Sep. 22, 2016.

International Search Report and Written Opinion, PCT/US2016/044020, dated Sep. 30, 2016.

International Search Report and Written Opinion, PCT/US2016/044874, dated Oct. 7, 2016.

International Search Report and Written Opinion, PCT/US2016/044875, dated Oct. 5, 2016.

International Search Report and Written Opinion, PCT/US2016/044876, dated Oct. 21, 2016.

International Search Report and Written Opinion, PCT/US2016/044877, dated Sep. 29, 2016.

Zhang et al., *Application-Aware and Software-Defined SSD Scheme for Tencent Large-Scale Storage System*, 2016 IEEE 22nd International Conference on Parallel and Distributed Systems, Dec. 2016, pp. 482-490, Institute of Electrical and Electronics Engineers (IEEE) Computer Society, Digital Object Identifier: 10.1109/ICPADS.2016.0071, USA.

Bjørling, *OpenChannel Solid State Drives NVMe Specification*, Revision 1.2, Apr. 2016, 24 pages, LightNVM.io (online), URL: http://lightnvm.io/docs/Open-ChannelSSDInterfaceSpecification12-final.pdf.

International Search Report and Written Opinion, PCT/US2017/012539, dated Apr. 19, 2017.

Storer et al., *Pergamum: Replacing Tape with Energy Efficient, Reliable, Disk-Based Archival Storage*, Fast '08: 6th USENIX Conference on File and Storage Technologies, Feb. 2008 pp. 1-16, San Jose, CA.

Hwang et al., *RAID-x: A New Distributed Disk Array for I/O-Centric Cluster Computing*, Proceedings of the 9th IEEE International Symposium on High Performance Distributed Computing (HPDC '00), Aug. 2000, pp. 279-286, IEEE, USA.

International Search Report and Written Opinion, PCT/US2015/018169, dated May 15, 2015.

International Search Report and Written Opinion, PCT/US2015/034302, dated Sep. 11, 2015.

International Search Report, PCT/US2015/034291, dated Sep. 30, 2015.

International Search Report, PCT/US2015/044370, dated Dec. 15, 2015.

International Search Report, PCT/US2015/014604, dated Jul. 2, 2015.

\* cited by examiner

Storage System 400
Detect A Change To A Topology Of The Storage System Consisting Of Different Sets Of Blades Configured Within One Of A Plurality Of Chassis  402
Reconfigure The Storage System To Change An Allocation Of Resources To One Or More Authorities Responsive To Detecting The Change To The Topology Of The Storage System  404
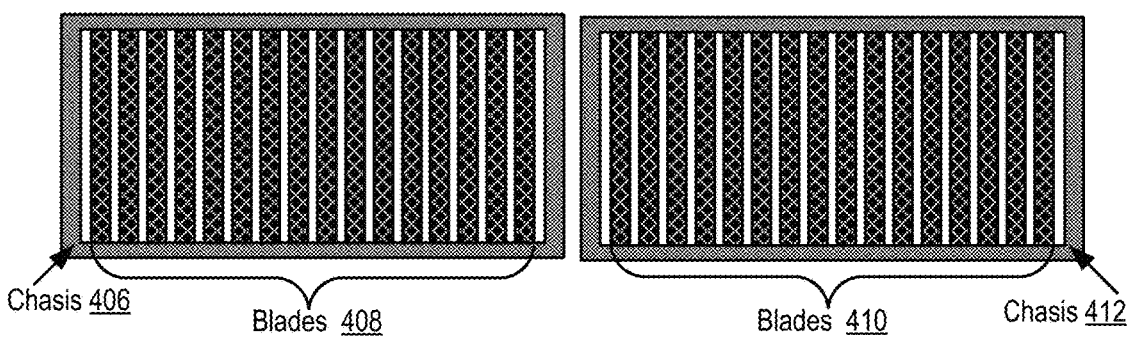
Chasis 406   Blades 408   Blades 410   Chasis 412
FIG. 4

DYNAMICALLY CONFIGURING A STORAGE SYSTEM TO FACILITATE INDEPENDENT SCALING OF RESOURCES

BACKGROUND

Technical Field

The field of the invention is data processing, or, more specifically, methods, apparatus, and products for dynamically configuring a storage system to facilitate independent scaling of resources.

Background Art

Modern storage systems can include a variety of resources such as computing resources and storage resources. Such resources typically must be scaled together. For example, additional processing resources must be added in order to add more storage resources and additional storage resources must be added in order to add more processing resources. The inability to scale one type of resource without scaling another type of resources inhibits the ability to create a storage system that is tailored to the specific needs of the storage system users.

SUMMARY OF INVENTION

Methods, apparatuses, and products for dynamically configuring a storage system to facilitate independent scaling of resources, including: detecting a change to a topology of the storage system consisting of different sets of blades configured within one of a plurality of chassis; and reconfiguring the storage system to change an allocation of resources to one or more authorities responsive to detecting the change to the topology of the storage system.

The foregoing and other objects, features and advantages of the invention will be apparent from the following more particular descriptions of example embodiments of the invention as illustrated in the accompanying drawings wherein like reference numbers generally represent like parts of example embodiments of the invention.

BRIEF DESCRIPTION OF DRAWINGS

FIG. 4 sets forth a flowchart illustrating an example method of dynamically configuring a storage system to facilitate independent scaling of resources according to embodiments of the present disclosure.

DESCRIPTION OF EMBODIMENTS

Figure 1:
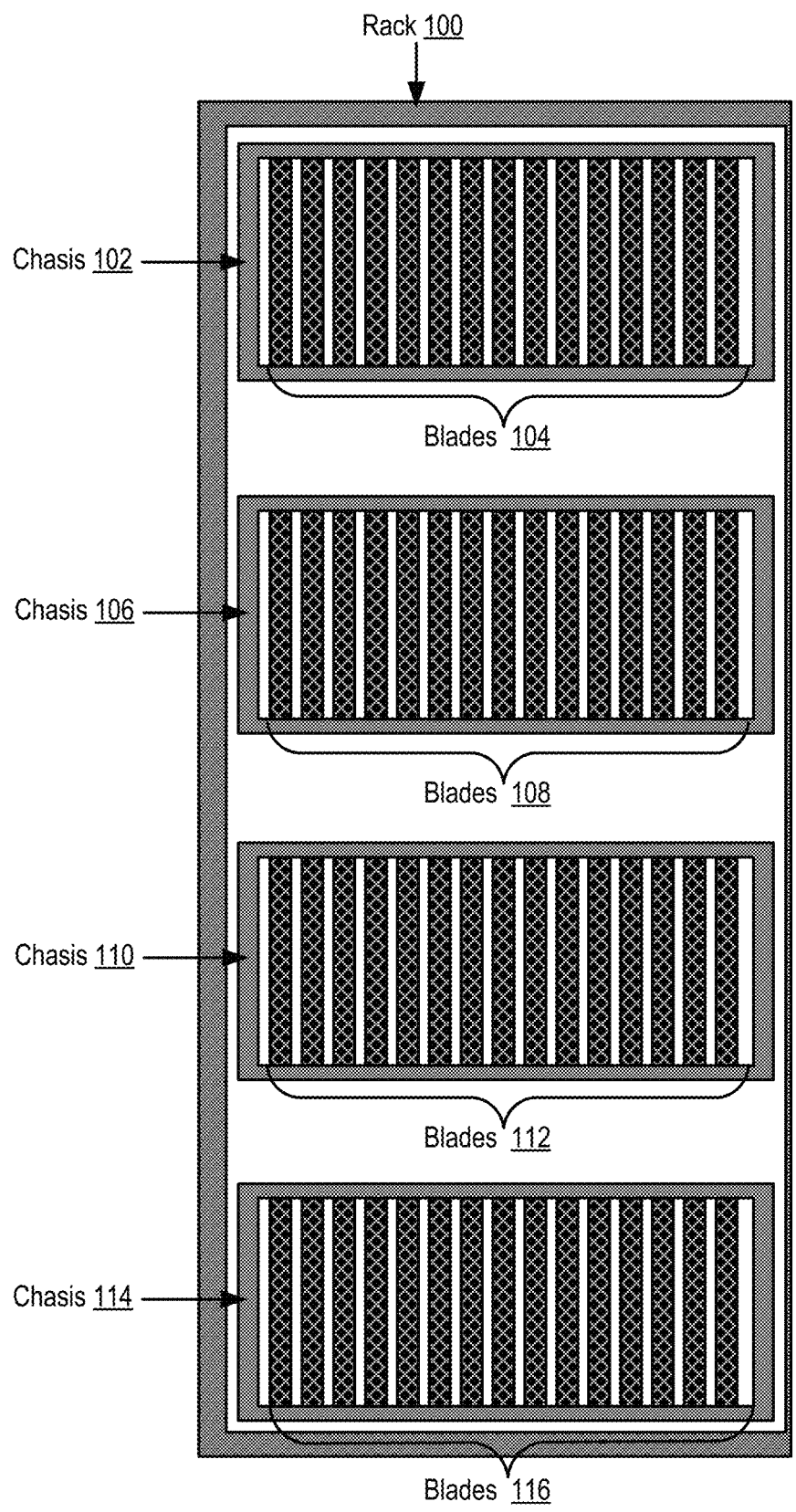
FIG. 1 sets forth a diagram of a storage system in which resources may be independently scaled according to embodiments of the present disclosure.

Example methods, apparatus, and products for dynamically configuring a storage system to facilitate independent scaling of resources in accordance with the present disclosure are described with reference to the accompanying drawings, beginning with FIG. 1. FIG. 1 sets forth a diagram of a storage system in which resources may be independently scaled according to embodiments of the present disclosure. The storage system of FIG. 1 includes a plurality of chassis (102, 106, 110, 114) mounted within a rack (100). The rack (100) depicted in FIG. 1 may be embodied as a standardized frame or enclosure for mounting multiple equipment modules, such as each of the chassis (102, 106, 110, 114) depicted in FIG. 1. The rack (100) may be embodied, for example, as a 19-inch rack that includes edges or ears that protrude on each side, thereby enabling a chassis (102, 106, 110, 114) or other module to be fastened to the rack (100) with screws or some other form of fastener.

The chassis (102, 106, 110, 114) depicted in FIG. 1 may be embodied, for example, as passive elements that includes no logic. Each chassis (102, 106, 110, 114) may include a plurality of slots, where each slot is configured to receive a blade. Each chassis (102, 106, 110, 114) may also include a mechanism, such as a power distribution bus, that is utilized to provide power to each blade that is mounted within the chassis (102, 106, 110, 114). Each chassis (102, 106, 110, 114) may further include a communication mechanism, such as a communication bus, that enables communication between each blade that is mounted within the chassis (102, 106, 110, 114). The communication mechanism may be embodied, for example, as an Ethernet bus, Peripheral Component Interconnect Express ('PCIe') bus, InfiniBand bus, and so on. In some embodiments, each chassis (102, 106, 110, 114) may include at least two instances of both the power distribution mechanism and the communication mechanism, where each instance of the power distribution mechanism and each instance of the communication mechanism may be enabled or disabled independently.

Each chassis (102, 106, 110, 114) depicted in FIG. 1 may also include one or more ports for receiving an external communication bus that enables communication between multiple chassis (102, 106, 110, 114), directly or through a switch, as well as communications between a chassis (102, 106, 110, 114) and an external client system. The external communication bus may use a technology such as Ethernet, InfiniBand, Fibre Channel, and so on. In some embodiments, the external communication bus may use different communication bus technologies for inter-chassis communication than is used for communication with an external client system. In embodiments where one or more switches are deployed, each switch may act as a translation between multiple protocols or technologies. When multiple chassis (102, 106, 110, 114) are connected to define a storage cluster, the storage cluster may be accessed by a client using either proprietary interfaces or standard interfaces such as network file system ('NFS'), common internet file system ('CIFS'), small computer system interface ('SCSI'), hypertext transfer protocol ('HTTP'), and so on. Translation from the client protocol may occur at the switch, external communication bus, or within each blade.

Each chassis (102, 106, 110, 114) depicted in FIG. 1 houses fifteen blades (104, 108, 112, 116), although in other embodiments each chassis (102, 106, 110, 114) may house more or fewer blades. Each of the blades (104, 108, 112, 116) depicted in FIG. 1 may be embodied, for example, as a computing device that includes one or more computer processors, dynamic random access memory ('DRAM'), flash memory, interfaces for one more communication busses, interfaces for one or more power distribution busses, cooling components, and so on. Although the blades (104, 108, 112, 116) will be described in more detail below, readers will appreciate that the blades (104, 108, 112, 116) depicted in FIG. 1 may be embodied as different types of blades, such that the collective set of blades (104, 108, 112, 116) include heterogeneous members. Blades may be of different types as some blades (104, 108, 112, 116) may only provide processing resources to the overall storage system, some blades (104, 108, 112, 116) may only provide storage resources to the overall storage system, and some blades (104, 108, 112, 116) may provide both processing resources and storage resources to the overall storage system. Furthermore, even the blades (104, 108, 112, 116) that are identical in type may be different in terms of the amount of storage resources that the blades (104, 108, 112, 116) provide to the overall storage system. For example, a first blade that only provides storage resources to the overall storage system may provide 8 TB of storage while a second blade that only provides storage resources to the overall storage system may provide 16 TB of storage. The blades (104, 108, 112, 116) that are identical in type may also be different in terms of the amount of processing resources that the blades (104, 108, 112, 116) provide to the overall storage system. For example, a first blade that only provides processing resources to the overall storage system may include more processors or more powerful processors than a second blade that only provides processing resources to the overall storage system. Readers will appreciate that other differences may also exist between two individual blades and that blade uniformity is not required according to embodiments described herein.

Although not explicitly depicted in FIG. 1, each chassis (102, 106, 110, 114) may include one or more modules, data communications bus, or other apparatus that is used to identify which type of blade is inserted into a particular slot of the chassis (102, 106, 110, 114). In such an example, a management module may be configured to request information from each blade in each chassis (102, 106, 110, 114) when each blade is powered on, when the blade is inserted into a chassis (102, 106, 110, 114), or at some other time. The information received by the management module can include, for example, a special purpose identifier maintained by the blade that identifies the type (e.g., storage blade, compute blade, hybrid blade) of blade that has been inserted into the chassis (102, 106, 110, 114). In an alternative embodiment, each blade (102, 106, 110, 114) may be configured to automatically provide such information to a management module as part of a registration process.

In the example depicted in FIG. 1, the storage system may be initially configured by a management module that is executing remotely. The management module may be executing, for example, in a network switch control processor. Readers will appreciate that such a management module may be executing on any remote CPU and may be coupled to the storage system via one or more data communication networks. Alternatively, the management module may be executing locally as the management module may be executing on one or more of the blades (104, 108, 112, 116) in the storage system.

In the example depicted in FIG. 1, one or more of the blades (104, 108, 112, 116) may be used for dynamically configuring the storage system to facilitate independent scaling of resources by: detecting a change to a topology of the storage system; reconfiguring the storage system to change an allocation of resources to one or more authorities responsive to detecting the change to the topology of the storage system; executing an authority on a first set of blades and reconfiguring the storage system by executing the authority on a second set of blades; associating storage on a first set of blades with a write group and reconfiguring the storage system by associating, in dependence upon a write group formation policy, storage on a second set of blades with the write group; detecting that an amount of processing resources within the storage system has changed and reconfiguring the storage system by increasing or decreasing an amount of processing resources allocated to one or more authorities; detecting that an amount of storage resources within the storage system has changed and reconfiguring the storage system by increasing or decreasing an amount of storage associated with one or more write groups; and detecting that a utilization of a particular resource has reached a utilization threshold, as will be described in greater detail below. Readers will appreciate that while in some embodiments one or more of the blades (104, 108, 112, 116) may be used for dynamically configuring the storage system to facilitate independent scaling of resources by carrying out the steps listed above, in alternative embodiments, another apparatus that includes at least computer memory and a computer processor may be used for dynamically configuring the storage system to facilitate independent scaling of resources by carrying out the steps listed above.

Figure 2:
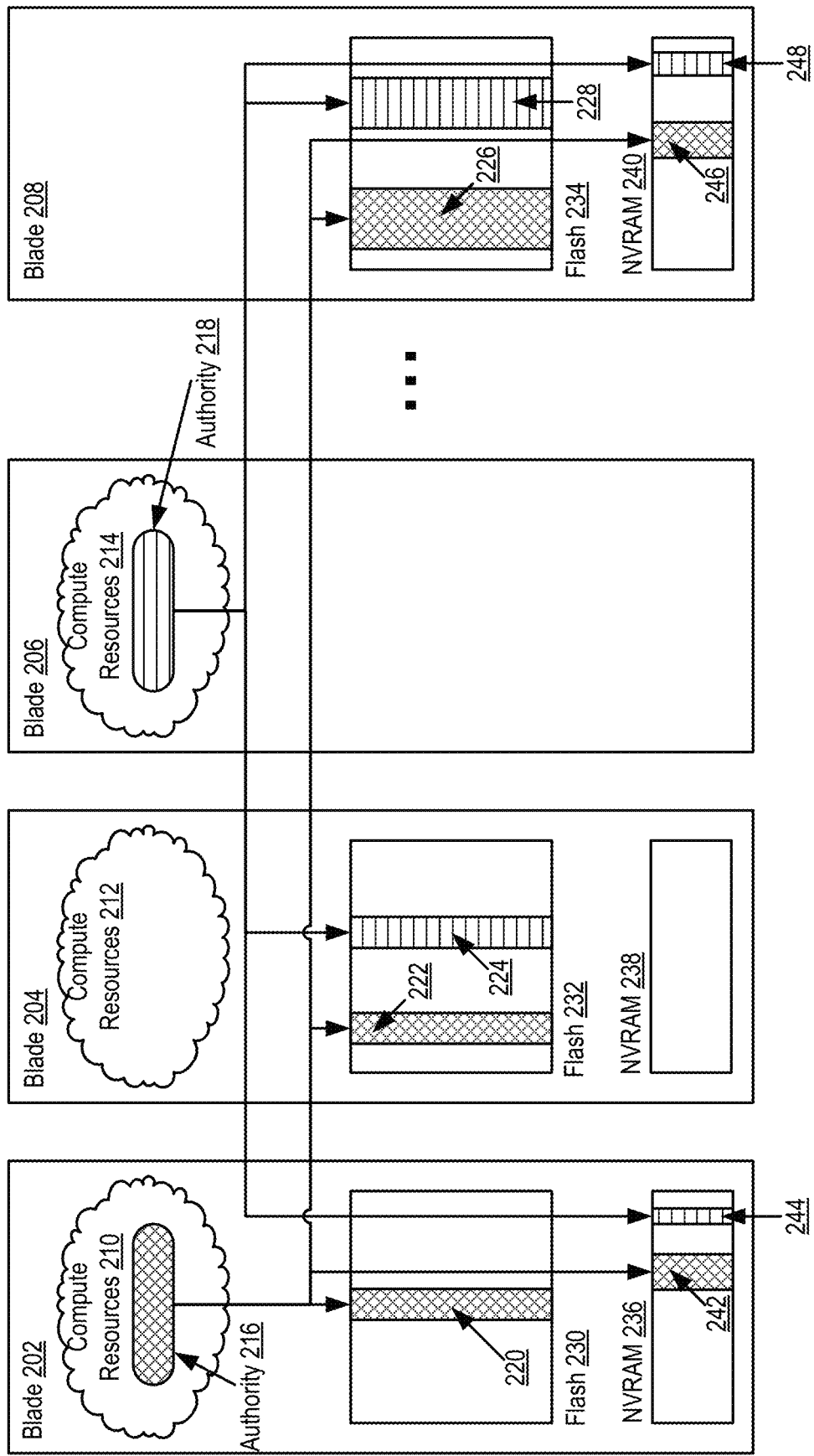
FIG. 2 sets forth a diagram of a set of blades useful in dynamically configuring a storage system to facilitate independent scaling of resources according to embodiments of the present disclosure.

For further explanation, FIG. 2 sets forth a diagram of a set of blades (202, 204, 206, 208) useful in dynamically configuring a storage system to facilitate independent scaling of resources according to embodiments of the present disclosure. Although blades will be described in greater detail below, the blades (202, 204, 206, 208) depicted in FIG. 2 may include compute resources (210, 212, 214), storage resources in the form of flash memory (230, 232, 234), storage resources in the form of non-volatile random access memory ('NVRAM') (236, 238, 240), or any combination thereof. In the example depicted in FIG. 2, the blades (202, 204, 206, 208) are of differing types. For example, one blade (206) includes only compute resources (214), another blade (208) includes only storage resources, depicted here as flash (234) memory and NVRAM (240), and two of the blades (202, 204) include compute resources (210, 212) as well as storage resources in the form of flash (230, 232) memory and NVRAM (236, 238). In such of an example, the blade (206) that includes only compute resources (214) may be referred to as a compute blade, the blade (208) that includes only storage resources may be referred to as a storage blade, and the blades (202, 204) that include both compute resources (210, 212) and storage resources may be referred to as a hybrid blade.

The compute resources (210, 212, 214) depicted in FIG. 2 may be embodied, for example, as one or more computer processors, as well as memory that is utilized by the computer processor but not included as part of general storage within the storage system. The compute resources (210, 212, 214) may be coupled for data communication with other blades and with external client systems, for example, via one or more data communication busses that are coupled to the compute resources (210, 212, 214) via one or more data communication adapters.

The flash memory (230, 232, 234) depicted in FIG. 2 may be embodied, for example, as multiple flash dies which may be referred to as packages of flash dies or an array of flash dies. Such flash dies may be packaged in any number of ways, with a single die per package, multiple dies per package, in hybrid packages, as bare dies on a printed circuit board or other substrate, as encapsulated dies, and so on. Although not illustrated in FIG. 2, an input output (I/O) port may be coupled to the flash dies and a direct memory access ('DMA') unit may also be coupled directly or indirectly to the flash dies. Such components may be implemented, for example, on a programmable logic device ('PLD') such as a field programmable gate array ('FPGA'). The flash memory (230, 232, 234) depicted in FIG. 2 may be organized as pages of a predetermined size, blocks that include a predetermined number of pages, and so on.

The NVRAM (236, 238, 240) depicted in FIG. 2 may be embodied, for example, as one or more non-volatile dual in-line memory modules ('NVDIMMs'), as one more DRAM dual in-line memory modules ('DIMMs') that receive primary power through a DIMM slot but are also attached to a backup power source such as a supercapacitor, and so on. The NVRAM (236, 238, 240) depicted in FIG. 2 may be utilized as a memory buffer for temporarily storing data that will be written to flash memory (230, 232, 234), as writing data to the NVRAM (236, 238, 240) may be carried out more quickly than writing data to flash memory (230, 232, 234). In this way, the latency of write requests may be significantly improved relative to a system in which data is written directly to the flash memory (230, 232, 234).

In the example method depicted in FIG. 2, a first blade (202) includes a first authority (216) that is executing on the compute resources (210) within the first blade (202) and a second blade (206) includes a second authority (218) that is executing on the compute resources (214) within the second blade (206). Each authority (216, 218) represents a logical partition of control and may be embodied as a module of software executing on the compute resources (210, 212, 214) of a particular blade (202, 204, 206). Each authority (216, 218) may be configured to control how and where data is stored in storage system. For example, authorities (216, 218) may assist in determining which type of erasure coding scheme is applied to the data, authorities (216, 218) may assist in determining where one or more portions of the data may be stored in the storage system, and so on. Each authority (216, 218) may control a range of inode numbers, segment numbers, or other data identifiers which are assigned to data by a file system or some other entity.

Readers will appreciate that every piece of data and every piece of metadata stored in the storage system is owned by a particular authority (216, 218). Each authority (216, 218) may cause data that is owned by the authority (216, 218) to be stored within storage that is located within the same blade whose computing resources are supporting the authority (216, 218) or within storage that is located on some other blade. For example, the authority (216) that is executing on the compute resources (210) within a first blade (202) has caused data to be stored within a portion (220) of flash (230) and a portion (242) of NVRAM (236) that is physically located within the first blade (202), The authority (216) that is executing on the compute resources (210) within the first blade (202) has also caused data to be stored within a portion (222) of flash (232) on the second blade (204) in the storage system as well as a portion (226) of flash (234) on the fourth blade (208) in the storage system. Likewise, the authority (218) that is executing on the compute resources (214) within the third blade (202) has caused data to be stored within a portion (244) of NVRANI (236) that is physically located within the first blade (202), within a portion (224) of flash (232) within the second blade (204), within a portion (228) of flash (234) within the fourth blade (208), and within a portion (246) of NVRANI (240) within the fourth blade (208).

Readers will appreciate that many embodiments other than the embodiment depicted in FIG. 2 are contemplated as it relates to the relationship between data, authorities, and system components. In some embodiments, every piece of data and every piece of metadata has redundancy in the storage system. In some embodiments, the owner of a particular piece of data or a particular piece of metadata may be a ward, with an authority being a group or set of wards. Likewise, in some embodiments there are redundant copies of authorities. In some embodiments, authorities have a relationship to blades and the storage resources contained therein. For example, each authority may cover a range of data segment numbers or other identifiers of the data and each authority may be assigned to a specific storage resource. Data may be stored in a segment according to some embodiments of the present disclosure, and such segments may be associated with a segment number which serves as indirection for a configuration of a RAID stripe. A segment may identify a set of storage resources and a local identifier into the set of storage resources that may contain data. In some embodiments, the local identifier may be an offset into a storage device and may be reused sequentially by multiple segments. In other embodiments the local identifier may be unique for a specific segment and never reused. The offsets in the storage device may be applied to locating data for writing to or reading from the storage device.

Readers will appreciate that if there is a change in where a particular segment of data is located (e.g., during a data move or a data reconstruction), the authority for that data segment should be consulted. In order to locate a particular piece of data, a hash value for a data segment may be calculated, an inode number may be applied, a data segment number may be applied, and so on. The output of such an operation can point to a storage resource for the particular piece of data. In some embodiments the operation described above may be carried out in two stages. The first stage maps an entity identifier (ID) such as a segment number, an inode number, or directory number to an authority identifier. This mapping may include a calculation such as a hash or a bit mask. The second stage maps the authority identifier to a particular storage resource, which may be done through an explicit mapping. The operation may be repeatable, so that when the calculation is performed, the result of the calculation reliably points to a particular storage resource. The operation may take the set of reachable storage resources as input, and if the set of reachable storage resources changes, the optimal set changes. In some embodiments, a persisted value represents the current assignment and the calculated value represents the target assignment the cluster will attempt to reconfigure towards.

The compute resources (210, 212, 214) within the blades (202, 204, 206) may be tasked with breaking up data to be written to storage resources in the storage system. When data is to be written to a storage resource, the authority for that data is located as described above. When the segment ID for data is already determined, the request to write the data is forwarded to the blade that is hosting the authority, as determined using the segment ID. The computing resources on such a blade may be utilized to break up the data and transmit the data for writing to a storage resource, at which point the transmitted data may be written as a data stripe in accordance with an erasure coding scheme. In some embodiments, data is requested to be pulled and in other embodiments data is pushed. When compute resources (210, 212, 214) within the blades (202, 204, 206) are tasked with reassembling data read from storage resources in the storage system, the authority for the segment ID containing the data is located as described above.

The compute resources (210, 212, 214) within the blades (202, 204, 206) may also be tasked with reassembling data read from storage resources in the storage system. The compute resources (210, 212, 214) that support the authority that owns the data may request the data from the appropriate storage resource. In some embodiments, the data may be read from flash storage as a data stripe. The compute resources (210, 212, 214) that support the authority that owns the data may be utilized to reassemble the read data, including correcting any errors according to the appropriate erasure coding scheme, and forward the reassembled data to the network. In other embodiments, breaking up and reassembling data, or some portion thereof, may be performed by the storage resources themselves.

The preceding paragraphs discuss the concept of a segment. A segment may represent a logical container of data in accordance with some embodiments. A segment may be embodied, for example, as an address space between medium address space and physical flash locations. Segments may also contain metadata that enables data redundancy to be restored (rewritten to different flash locations or devices) without the involvement of higher level software. In some embodiments, an internal format of a segment contains client data and medium mappings to determine the position of that data. Each data segment may be protected from memory and other failures, for example, by breaking the segment into a number of data and parity shards. The data and parity shards may be distributed by striping the shards across storage resources in accordance with an erasure coding scheme.

Figure 3:
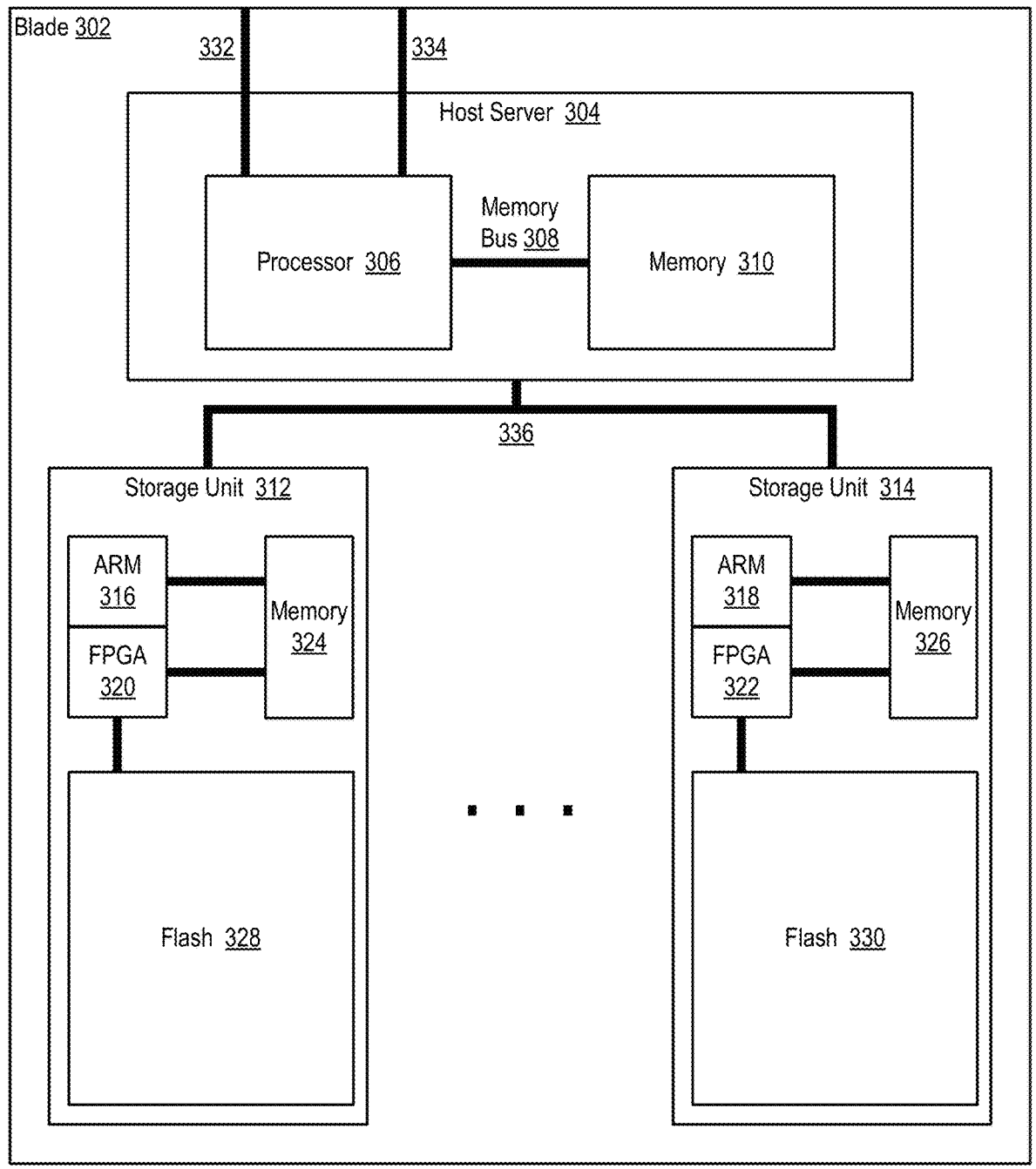
FIG. 3 sets forth a diagram of a blade useful in dynamically configuring a storage system to facilitate independent scaling of resources according to embodiments of the present disclosure.

For further explanation, FIG. 3 sets forth a diagram of a blade (302) useful in dynamically configuring a storage system to facilitate independent scaling of resources according to embodiments of the present disclosure. As described above, the storage system may include storage blades, compute blades, hybrid blades, or any combination thereof. The example depicted in FIG. 3 represents an embodiment of a hybrid blade as the blade (302) includes both compute resources and storage resources.

The compute resources in the blade (302) depicted in FIG. 3 includes a host server (304) that includes a computer processor (306) coupled to memory (310) via a memory bus (308). The computer processor (306) depicted in FIG. 3 may be embodied, for example, as a central processing unit ('CPU') or other form of electronic circuitry configured to execute computer program instructions. The computer processor (306) may utilize the memory (310) to store data or other information useful during the execution of computer program instructions by the computer processor (306). Such memory (310) may be embodied, for example, as DRAM that is utilized by the computer processor (306) to store information when the computer processor (306) is performing computational tasks such as creating and sending I/O operations to one of the storage units (312, 314), breaking up data, reassembling data, and other tasks.

In the example depicted in FIG. 3, the computer processor (306) is coupled to two data communication links (332, 334). Such data communications links (332, 334) may be embodied, for example, as Ethernet links that are coupled to a data communication network via a network adapter. The computer processor (306) may receive input/output operations that are directed to the attached storage units (312, 314), such as requests to read data from the attached storage units (312, 314) or requests to write data to the attached storage units (312, 314).

The blade (302) depicted in FIG. 3 also includes storage resources in the form of one or more storage units (312, 314). Each storage unit (312, 314) may include flash (328, 330) memory as well as other forms of memory (324, 326), such as the NVRAM discussed above. In the example depicted in FIG. 3, the storage units (312, 314) may include integrated circuits such as a field-programmable gate array ('FPGA') (320, 322), microprocessors such as an Advanced RISC Machine ('ARM') microprocessor that are utilized to write data to and read data from the flash (328, 330) memory as well as the other forms of memory (324, 326) in the storage unit (312, 314), or any other form of computer processor. The FPGAs (320, 322) and the ARM (316, 318) microprocessors may, in some embodiments, perform operations other than strict memory accesses. For example, in some embodiments the FPGAs (320, 322) and the ARM (316, 318) microprocessors may break up data, reassemble data, and so on. In the example depicted in FIG. 3, the computer processor (306) may access the storage units (312, 314) via a data communication bus (336) such as a PCIe bus.

Readers will appreciate that a compute blade may be similar to the blade (302) depicted in FIG. 3 as the compute blade may include one or more host servers that are similar to the host server (304) depicted in FIG. 3. Such a compute blade may be different than the blade (302) depicted in FIG. 3, however, as the compute blade may lack the storage units (312, 314) depicted in FIG. 3. Readers will further appreciate that a storage blade may be similar to the blade (302) depicted in FIG. 3 as the storage blade may include one or more storage units that are similar to the storage units (312, 314) depicted in FIG. 3. Such a storage blade may be different than the blade (302) depicted in FIG. 3, however, as the storage blade may lack the host server (304) depicted in FIG. 3. The example blade (302) depicted in FIG. 3 is included only for explanatory purposes. In other embodiments, the blades may include additional processors, additional storage units, compute resources that are packaged in a different manner, storage resources that are packaged in a different manner, and so on.

For further explanation, FIG. 4 sets forth a flowchart illustrating an example method of dynamically configuring a storage system (400) to facilitate independent scaling of resources according to embodiments of the present disclosure. Resources in a storage system may be independently scaled, for example, by altering the amount of storage resources available to an entity in the storage system without altering the amount of processing resources available to the entity, by an altering the amount of processing resources available to an entity in the storage system without altering the amount of storage resources available to the entity, and so on. Examples of resources that may be independently scaled can include processing resources, storage resources, networking resources, and others.

The example method depicted in FIG. 4 includes detecting (402) a change to a topology of the storage system (400). The topology of the storage system (400) can be characterized by various aspects of the physical configuration of the storage system (400) such as, for example, the number of chassis in the storage system (400), the number of blades in each chassis, the storage capacity of one or more blades, the processing capacity one or more blades, and so on. Detecting (402) a change to the topology of the storage system (400) may be carried out, for example, by detecting that a new chassis has been added to the storage system (400), by detecting that a new blade has been added to the storage system (400), by detecting that a blade has failed or otherwise been removed from the storage system (400), by detecting that a blade has been moved from a first chassis to a second chassis, and so on. In such an example, detecting that a component has been added to the storage system (400) may be accomplished through the use of sensors that detect the insertion of a component, through the use of a device registration process that is carried out when a new component is inserted into the storage system (400), and in other ways. Detecting that a component has been removed from the storage system (400) may be accomplished through the use of sensors that detect the removal of a component, through the use of a communication process determining that a component is unreachable, and in other ways.

The topology of the storage system (400) may also be characterized by various aspects of the logical configuration of the storage system (400) such as, for example, a configuration setting that defines a RAID level that is utilized for striping data across storage devices in the storage system, a configuration setting that defines which redundancy policy that data contained within a particular write group should adhere to, a configuration setting that identifies the number of snapshots to be retained in the system, or any other configuration that impacts how the storage system (400) will operate. Detecting (402) a change to the topology of the storage system (400) may therefore be carried out, for example, by detecting that a particular configuration setting has changed.

In the example method depicted in FIG. 4, the storage system (400) consists of different sets of blades (408, 410) configured within one of a plurality of chassis (406, 412). The sets of blades (408, 410) may be different as the sets may include a different number of blades, blades of differing types, blades with non-uniform storage capacities, blades with non-uniform processing capacities, and so on. In addition to the sets of blades (408, 410) being different, two blades within the same set may also be different as the two blades may have non-uniform amounts and types of storage resources within each blade, the two blades may have non-uniform amounts and types of processing resources within each blade, and so on.

The example method depicted in FIG. 4 includes reconfiguring (404) the storage system (400) to change an allocation of resources to one or more authorities responsive to detecting the change to the topology of the storage system (400). Reconfiguring (404) the storage system (400) to change an allocation of resources to one or more authorities may be carried out, for example, by changing the amount of processing resources that are dedicated to executing a particular authority, by changing the amount of storage resources that are available for use by a particular authority, and so on.

Figure 5:
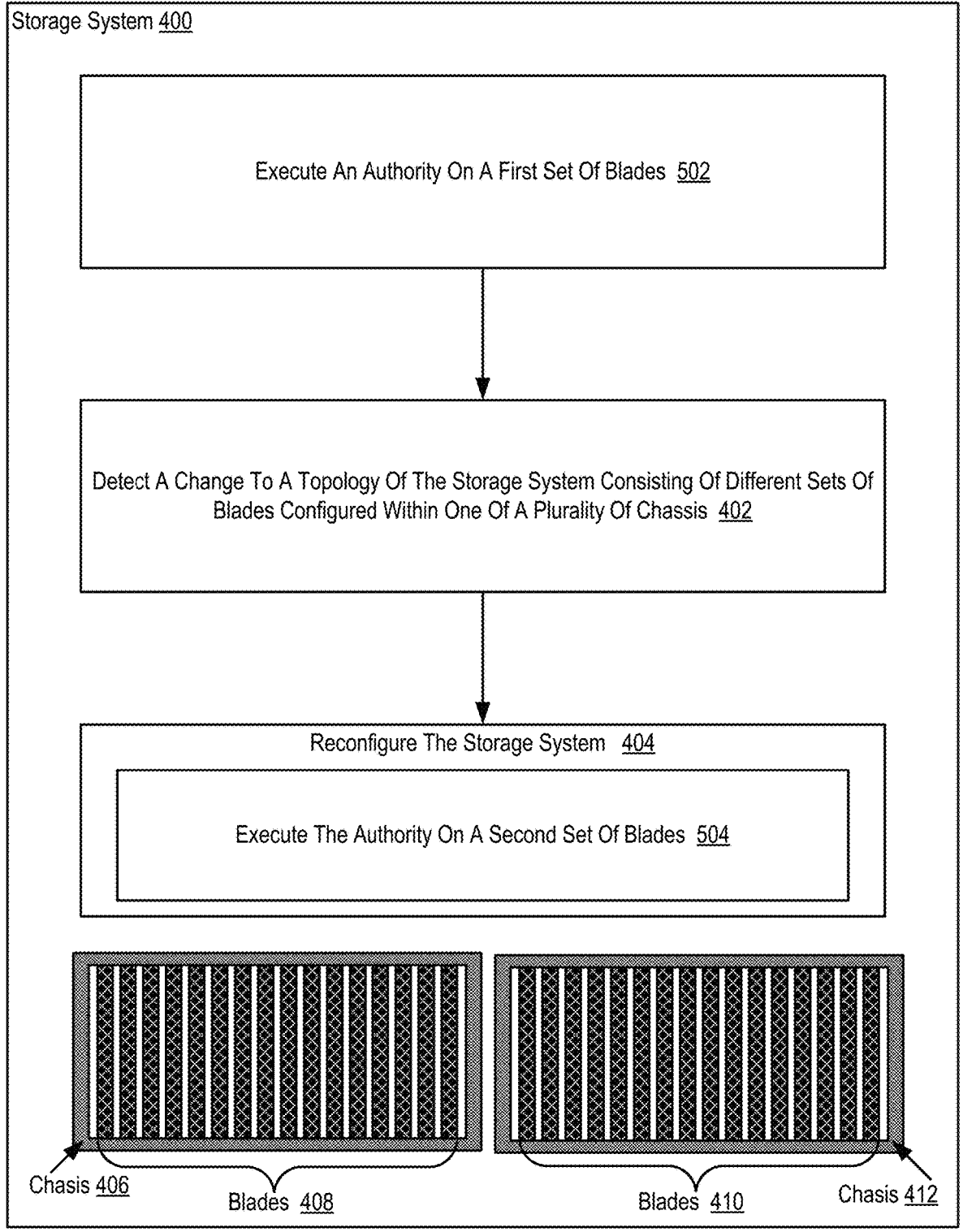
FIG. 5 sets forth a flowchart illustrating an additional example method of dynamically configuring a storage system to facilitate independent scaling of resources according to embodiments of the present disclosure.

For further explanation, FIG. 5 sets forth a flowchart illustrating an additional example method of dynamically configuring a storage system (400) to facilitate independent scaling of resources according to embodiments of the present disclosure. The example method depicted in FIG. 5 is similar to the example method depicted in FIG. 4, as the example method depicted in FIG. 5 also includes detecting (402) a change to a topology of the storage system (400) and reconfiguring (404) the storage system (400) to change an allocation of resources to one or more authorities responsive to detecting the change to the topology of the storage system (400).

The example method depicted in FIG. 5 also includes executing (502) an authority on a first set of blades (408). An authority may initially be executed (502) on computing resources within a single blade or initially executed (502) on computing resources within multiple blades. As such, the first set of blades (408) that the authority is executed (502) on may be composed of one or more blades. In the embodiment depicted in FIG. 4, the first set of blades (408) is depicted as residing within a single chassis (406). Readers will appreciate, however, that in other embodiments the authority may be executed (502) on a set of blades that are distributed across multiple chassis (406, 412). In embodiments where the authority is executed (502) on computing resources within multiple blades, the blades may be configured to exchange information between each instance of the authority such that each instance of the authority is aware of actions taken by other instances of the authority. Such information may be exchanged over data communication busses that are internal to a particular chassis (406) when the blades reside within the same chassis (406), and such information may be exchanged over inter-chassis data communication busses when the blades reside within the different chassis (406, 412).

In the example method depicted in FIG. 5, reconfiguring (404) the storage system (400) can include executing (504) the authority on a second set of blades (410). Although the second set of blades (410) depicted in FIG. 5 are depicted as including none of the blades that were in the first set of blades (408), readers will appreciate that in other embodiments each set may include one or more overlapping blades. For example, the second set of blades (410) may include all of the blades in the first set of blades (408) as well as one or more additional blades, the second set of blades (410) may include a subset of the blades in the first set of blades (408), the second set of blades (410) may include a subset of the blades in the first set of blades (408) as well as one or more additional blades, and so on. Reconfiguring (404) the storage system (400) to change an allocation of resources to one or more authorities may be carried out, for example, by ceasing execution of an authority on a particular blade, by beginning execution of the authority on a particular blade, and so on.

Figure 6:
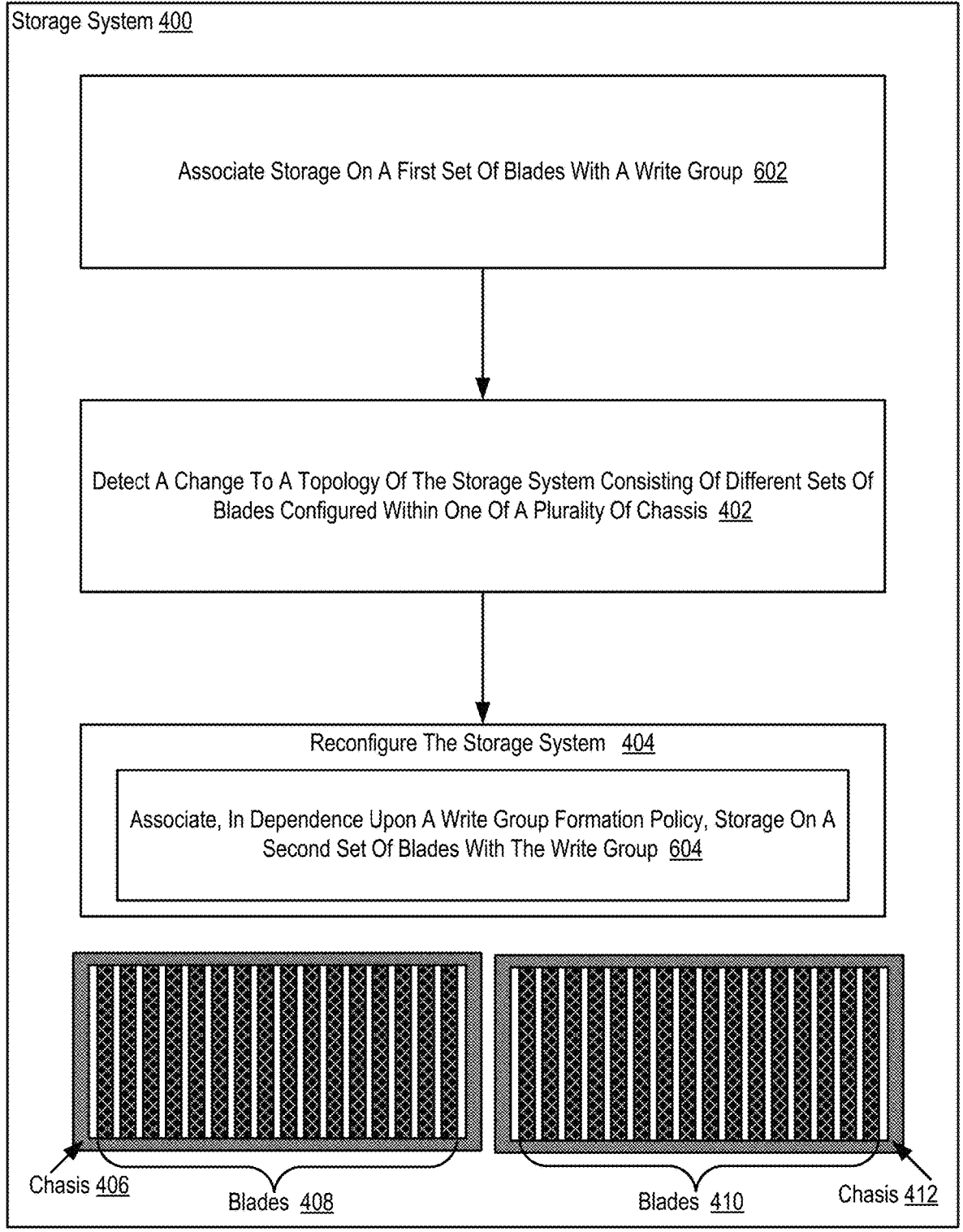
FIG. 6 sets forth a flowchart illustrating an additional example method of dynamically configuring a storage system to facilitate independent scaling of resources according to embodiments of the present disclosure.

For further explanation, FIG. 6 sets forth a flowchart illustrating an additional example method of dynamically configuring a storage system (400) to facilitate independent scaling of resources according to embodiments of the present disclosure. The example method depicted in FIG. 6 is similar to the example method depicted in FIG. 4, as the example method depicted in FIG. 6 also includes detecting (402) a change to a topology of the storage system (400) and reconfiguring (404) the storage system (400) to change an allocation of resources to one or more authorities responsive to detecting the change to the topology of the storage system (400).

The example method depicted in FIG. 6 also includes associating (602) storage on a first set of blades (408) with a write group. A write group represents a logical grouping of data that is stored in the storage system (400). The logical grouping may represent, for example, data associated with a particular user, data associated with a particular application, and so on. The data that is included in a particular write group may be striped across many blades and many storage resources contained therein. The data that is included in a particular write group may also be subject to a redundancy policy. Such a redundancy policy may be used to determine the amount of redundancy data that must be stored within the storage system (400), such that a predetermined number of blades that contain some portion of the data that is included in a particular write group may fail without resulting in the loss of any of the data that is included in the particular write group. The predetermined number of blades that contain some portion of the data that is included in a particular write group may fail without resulting in the loss of any of the data that is included in the particular write group because the data contained on the failed blade may be rebuilt using redundancy data, data stored on blades that have not failed, or some combination thereof. Consider, as a very simple example of the inclusion of redundancy data, an example in which user data was striped across two blades and redundancy data was stored on an a third blade, where the redundancy data was generated by performing an XOR using the user data as input. In such an example, if one of the blades that contained user data failed, the data stored on the failed blade may be reconstructed using the user data stored on the functioning blade and the redundancy data.

In the example method depicted in FIG. 6, reconfiguring (404) the storage system (400) can include associating (604), in dependence upon a write group formation policy, storage on a second set of blades (410) with the write group. The second set of blades (410) may include all blades within the first set of blades (408) as well as additional blades, a subset of the blades within the first set of blades (408), a subset of the blades within the first set of blades (408) as well as additional blades, no blades that were included within the first set of blades (408), and so on.

In the example method depicted in FIG. 6, storage on a second set of blades (410) is associated (604) with the write group in dependence upon a write group formation policy. The write group formation policy may be embodied as one or more rules that define desired attributes of the write group. The write group formation policy may specify, for example, that only write groups that adhere to a certain redundancy policy should be formed, that only write groups whose RAID overhead is equal to or below a certain threshold should be formed, that only write groups expected to generate an amount of network traffic that is equal to or below a certain threshold should be formed, and so on. In the example method depicted in FIG. 6, many candidate blade sets may be identified and each candidate blade set may be evaluated to determine whether the candidate blade set is in compliance with the write group formation policy. In such an example, the write group may only be associated (604) with a second set of blades (410) that is in compliance with the write group formation policy. If no set of blades are fully compliant with the write group formation policy, the write group may only be associated (604) with a second set of blades (410) that are most compliant with the write group formation policy.

Consider an example in which a storage system (400) included ten chassis that each included fifteen blades. In such an example, assume that the write group formation policy specifies that write groups should be formed such that: 1) the failure of an entire chassis will not cause data loss, and 2) the failure of any two blades within a single chassis will not cause data loss. In such an example, any write group whose data would be stored on three or more blades within a single chassis would not adhere to the write group formation policy as the failure of a single chassis (which should not result in data loss) could result in the failure of three of more blades (which can result in data loss). As such, the write group may only be associated (604) with a second set of blades (410) that include no more than two blades in a single chassis in order for the write group to conform to the write group formation policy.

Figure 7:
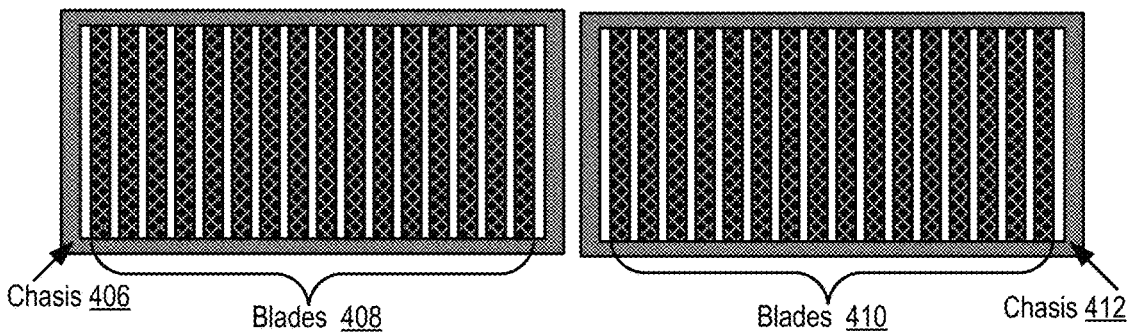
FIG. 7 sets forth a flowchart illustrating an additional example method of dynamically configuring a storage system to facilitate independent scaling of resources according to embodiments of the present disclosure.

For further explanation, FIG. 7 sets forth a flowchart illustrating an additional example method of dynamically configuring a storage system (400) to facilitate independent scaling of resources according to embodiments of the present disclosure. The example method depicted in FIG. 7 is similar to the example method depicted in FIG. 4, as the example method depicted in FIG. 7 also includes detecting (402) a change to a topology of the storage system (400) and reconfiguring (404) the storage system (400) to change an allocation of resources to one or more authorities responsive to detecting the change to the topology of the storage system (400).

In the example method depicted in FIG. 7, detecting (402) a change to a topology of the storage system (400) can include detecting (702) that an amount of processing resources within the storage system (400) has changed. Detecting (702) that an amount of processing resources within the storage system (400) has changed may be carried out, for example, by detecting that a blade that contains processing resources has been inserted into one of the chassis (406, 412) within the storage system (400), by detecting that a blade that contains processing resources has been removed from one of the chassis (406, 412) within the storage system (400), by detecting that a blade that contains processing resources has failed, by detecting that a blade that contains processing resources has recovered from a failure, and so on. Such events may be detected, for example, through the use of sensors, device discovery processes, device registration processes, and many other mechanisms. When an event such as a blade insertion occurs, an inventory tracking process may be configured to request information from the inserted blade that identifies the resources contained in the blade in order to determine whether the inserted blade includes processing resources. Such information may be maintained and later utilized if the blade is removed from the storage system, the blade fails, or the blade recovers from failure to determine whether the removed, failed, or recovered blade includes processing resources.

In the example method depicted in FIG. 7, detecting (402) a change to a topology of the storage system (400) can alternatively include detecting (704) that an amount of storage resources within the storage system (400) has changed. Detecting (704) that an amount of storage resources within the storage system (400) has changed may be carried out, for example, by detecting that a blade that contains storage resources has been inserted into one of the chassis (406, 412), by detecting that a blade that contains storage resources has been removed from one of the chassis (406, 412), by detecting that a blade that contains storage resources has failed, by detecting that a blade that contains storage resources has recovered from a failure, and so on. Such events may be detected, for example, through the use of sensors, device discovery processes, device registration processes, and many other mechanisms. When an event such as a blade insertion occurs, an inventory tracking process may be configured to request information from the inserted blade that identifies the resources contained in the blade in order to determine whether the inserted blade includes storage resources. Such information may be maintained and later utilized if the blade is removed from the storage system, the blade fails, or the blade recovers from failure to determine whether the removed, failed, or recovered blade includes storage resources.

In the example method depicted in FIG. 7, reconfiguring (404) the storage system (400) can include increasing (706) or decreasing an amount of processing resources allocated to one or more authorities. The amount of processing resources allocated to one or more authorities may be increased (706) or decreased, for example, by altering the set of blades that are utilized to execute the authority. For example, the authority may be executed on compute resources contained within an additional blade that was not being used to execute the authority prior to reconfiguring (404) the storage system (400), the authority may cease to be executed on compute resources contained within a blade that was being used to execute the authority prior to reconfiguring (404) the storage system (400), and so on. The amount of processing resources allocated to one or more authorities may also be increased (706) or decreased by adjusting the portion of the compute resources within a particular blade that are allocated for use in executing the authority. For example, if an authority was already executing on the first blade prior to reconfiguring (404) the storage system (400), the portion of the compute resources within the first blade that are allocated for use in executing the authority may be adjusted. Such an adjustment may be made expressly by changing a system setting. Such an adjustment may alternatively be made by assigning additional authorities to the compute resources within the first blade, or migrating other authorities away from the compute resources within the first blade, such that authority must share the compute resources with fewer or additional consumers of the compute resources.

In the example method depicted in FIG. 7, reconfiguring (404) the storage system (400) can alternatively include increasing (708) or decreasing an amount of storage associated with one or more write groups. The amount of storage associated with one or more write groups may be increased (708) or decreased, for example, by altering the set of blades that are utilized to provide storage for use by the one or more write groups. For example, storage resources on an additional blade that were not being used by the write group prior to reconfiguring (404) the storage system (400) may be allocated for use by the write group, storage resources on a blade that were being used by the write group prior to reconfiguring (404) the storage system (400) may be no longer allocated for use by the write group, and so on. The amount of storage associated with one or more write groups may also be increased (708) or decreased by adjusting the amount of storage resources within a particular blade that are associated with one or more write groups. For example, if storage resources on a first blade were associated with the one or more write groups prior to reconfiguring (404) the storage system (400), the amount of storage resources on the first blade that is associated with the one or more write groups may be changed.

Figure 8:
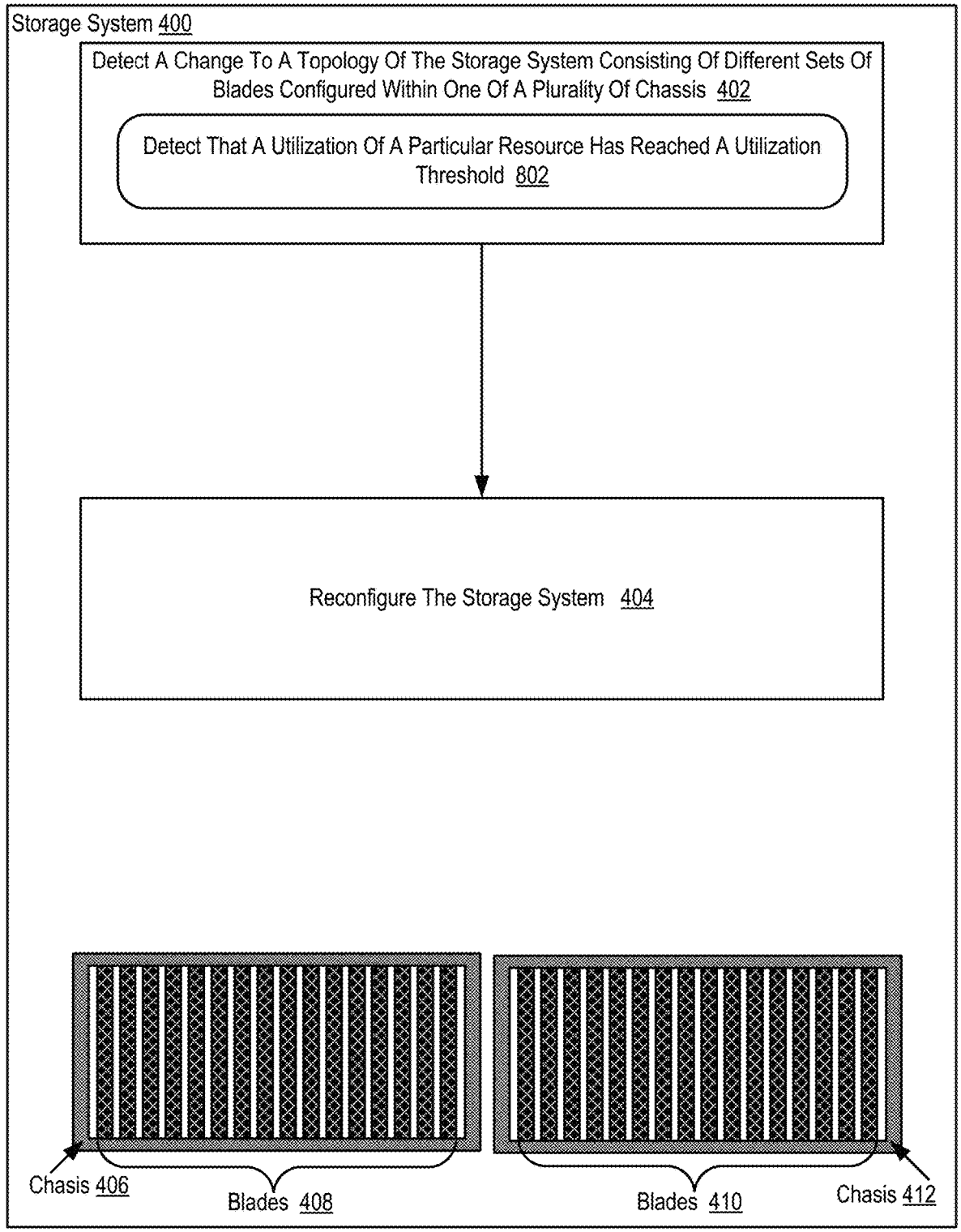
FIG. 8 sets forth a flowchart illustrating an additional example method of dynamically configuring a storage system to facilitate independent scaling of resources according to embodiments of the present disclosure.

For further explanation, FIG. 8 sets forth a flowchart illustrating an additional example method of dynamically configuring a storage system (400) to facilitate independent scaling of resources according to embodiments of the present disclosure. The example method depicted in FIG. 8 is similar to the example method depicted in FIG. 4, as the example method depicted in FIG. 8 also includes detecting (402) a change to a topology of the storage system (400) and reconfiguring (404) the storage system (400) to change an allocation of resources to one or more authorities responsive to detecting the change to the topology of the storage system (400).

In the example method depicted in FIG. 8, detecting (402) a change to a topology of the storage system (400) can include detecting (802) that a utilization of a particular resource has reached a utilization threshold. In the example method depicted in FIG. 8, the utilization threshold may be embodied as a value used to determine whether a particular resource is being underutilized. For example, a utilization threshold may be set such that when a computer processor within the storage system (400) is utilizing only 25% or less of all available processor cycles to execute instructions, the computer processor is deemed to be underutilized. In such an example, the storage system (400) may be reconfigured (404) to change an allocation of resources to one or more authorities by making the underutilized computer processor available for use by an additional authority, thereby enabling another authority to utilize the underutilized resource. Readers will appreciate that a similar situation may play out when the amount of storage allocated for use by a particular write group is underutilized and that such underutilized storage may be reallocated as part of a reconfiguration.

In the example method depicted in FIG. 8, the utilization threshold may also be embodied as a value used to determine whether a particular resource is being over utilized. For example, a utilization threshold may be set such that when a computer processor within the storage system (400) is utilizing 85% or more of all available processor cycles to execute instructions, the computer processor is deemed to be over utilized. In such an example, the storage system (400) may be reconfigured (404) to change an allocation of resources to one or more authorities by moving authorities that are executing on the over utilized computer processor to another computer processor, by making other computer processors available for use by an authority that is executing on the over utilized computer processor, and so on. Readers will appreciate that a similar situation may play out when the amount of storage allocated for use by a particular write group is over utilized and that additional storage within the storage system may be allocated for use by the write group as part of a reconfiguration.

In the examples described above, an authority executing on processing resources within a first blade may cause data to be stored on storage resources within a second blade. In such an example, the authority executing on a first blade may cause data to be stored on a second blade by sending a request to store data on the second blade to processing resources on the second blade. Alternatively, and particularly when there are no available processing resources on the second blade (e.g., the second blade is a storage blade), the processing resources on the first blade may have direct access to the storage resources on the second blade via a data communication link, via remote DMA hardware, or in other ways.

Figure 9:
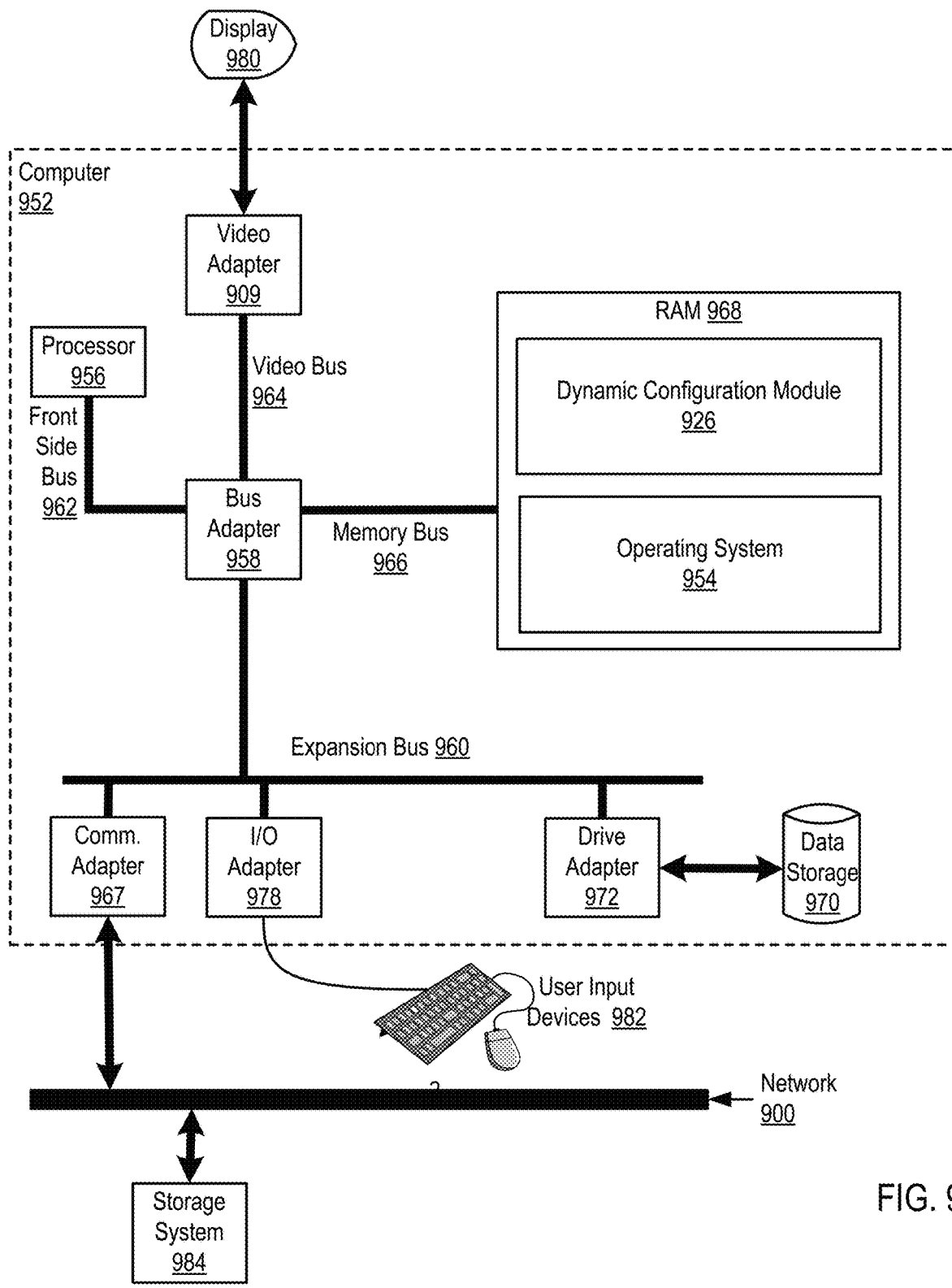
FIG. 9 sets forth a block diagram of automated computing machinery comprising an example computer useful in dynamically configuring a storage system to facilitate independent scaling of resources according to embodiments of the present disclosure.

For further explanation, FIG. 9 sets forth a block diagram of automated computing machinery comprising an example computer (952) useful in dynamically configuring a storage system to facilitate independent scaling of resources according to embodiments of the present disclosure. The computer (952) of FIG. 9 includes at least one computer processor (956) or "CPU" as well as random access memory ("RAM") (968) which is connected through a high speed memory bus (966) and bus adapter (958) to processor (956) and to other components of the computer (952). Stored in RAM (968) is a dynamic configuration module (926), a module of computer program instructions for dynamically configuring a storage system to facilitate independent scaling of resources according to embodiments of the present disclosure. The dynamic configuration module (926) may be configured for dynamically configuring the storage system to facilitate independent scaling of resources by: detecting a change to a topology of the storage system; reconfiguring the storage system to change an allocation of resources to one or more authorities responsive to detecting the change to the topology of the storage system; executing an authority on a first set of blades and reconfiguring the storage system by executing the authority on a second set of blades; associating storage on a first set of blades with a write group and reconfiguring the storage system by associating, in dependence upon a write group formation policy, storage on a second set of blades with the write group; detecting that an amount of processing resources within the storage system has changed and reconfiguring the storage system by increasing or decreasing an amount of processing resources allocated to one or more authorities; detecting that an amount of storage resources within the storage system has changed and reconfiguring the storage system by increasing or decreasing an amount of storage associated with one or more write groups; and detecting that a utilization of a particular resource has reached a utilization threshold, as was described in greater detail above.

Also stored in RAM (968) is an operating system (954). Operating systems useful in computers configured for dynamically configuring the storage system to facilitate independent scaling of resources according to embodiments described herein include UNIX™, Linux™, Microsoft XP™, AIX™, IBM's i5/OS™, and others as will occur to those of skill in the art. The operating system (954) and dynamic configuration module (926) in the example of FIG. 9 are shown in RAM (968), but many components of such software typically are stored in non-volatile memory also, such as, for example, on a disk drive (970).

The example computer (952) of FIG. 9 also includes disk drive adapter (972) coupled through expansion bus (960) and bus adapter (958) to processor (956) and other components of the computer (952). Disk drive adapter (972) connects non-volatile data storage to the computer (952) in the form of disk drive (970). Disk drive adapters useful in computers configured for dynamically configuring the storage system to facilitate independent scaling of resources according to embodiments described herein include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer (952) of FIG. 9 includes one or more input/output ("I/O") adapters (978). I/O adapters implement user-oriented input/output through, for example, software drivers and computer hardware for controlling output to display devices such as computer display screens, as well as user input from user input devices (982) such as keyboards and mice. The example computer (952) of FIG. 9 includes a video adapter (909), which is an example of an I/O adapter specially designed for graphic output to a display device (980) such as a display screen or computer monitor. Video adapter (909) is connected to processor (956) through a high speed video bus (964), bus adapter (958), and the front side bus (962), which is also a high speed bus.

The example computer (952) of FIG. 9 includes a communications adapter (967) for data communications with a storage system (984) as described above and for data communications with a data communications network (900). Such data communications may be carried out serially through RS-232 connections, through external buses such as a Universal Serial Bus ('USB'), a Fibre Channel data communications link, an Infiniband data communications link, through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for dynamically configuring the storage system to facilitate independent scaling of resources according to embodiments described herein include Ethernet (IEEE 802.3) adapters for wired data communications, Fibre Channel adapters, Infiniband adapters, and so on.

The computer (952) may implement certain instructions stored on RAM (968) for execution by processor (956) for dynamically configuring the storage system to facilitate independent scaling of resources. In some embodiments, dynamically configuring the storage system to facilitate independent scaling of resources may be implemented as part of a larger set of executable instructions. For example, the dynamic configuration module (926) may be part of an overall system management process.

Readers will appreciate although the flow charts depicted in FIGS. 4-8 are illustrated as occurring in a particular order, such an ordering is only required when expressly recited in the claims that are included below. The steps depicted in the Figures may occur in different orders, the steps may occur iteratively, or any combination thereof. Readers will further appreciate that the diagrams depicted in FIGS. 1-3 and FIG. 9 are only included for illustrative purposes, and that systems and apparatuses may be embodied utilizing additional hardware and software components.

Example embodiments of the present disclosure are described largely in the context of a methods and apparatus that are useful in dynamically configuring a storage system (400) to facilitate independent scaling of resources. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable processing means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, a read-only memory ('ROM'), an erasable programmable read-only memory (EPROM or Flash memory), a static random access memory ('SRAM'), a portable compact disc read-only memory ('CD-ROM'), a digital versatile disk ('DVD'), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture ('ISA') instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of dynamically configuring a storage system to facilitate independent scaling of resources, the method comprising:
    detecting a change to a topology of the storage system consisting of different sets of blades configured within one of a plurality of chassis, at least one blade of the different sets of blades having differing storage capacities, the change to the topology including a change in the number of blades in the storage system; and
    responsive to detecting the change to the topology of the storage system, reconfiguring the storage system to change an allocation of resources to one or more authorities without replicating any of the one or more authorities, each of the one or more authorities owning a segment of data, wherein the one or more authorities are configured to be identified through a hashing operation performed on the segment of data.

2. The method of claim 1, further comprising:
    executing an authority on a first set of blades, the authority having control for a range of inode numbers; and
    wherein reconfiguring the storage system further comprises executing the authority on a second set of blades.

3. The method of claim 1, further comprising:
    associating storage on a first set of blades with a write group; and
    wherein reconfiguring the storage system further comprises associating, in dependence upon a write group formation policy, storage on a second set of blades with the write group.

4. The method of claim 1 wherein:
    detecting the change to the topology of the storage system further comprises detecting that an amount of processing resources within the storage system has changed; and
    reconfiguring the storage system further comprises increasing or decreasing an amount of processing resources allocated to one or more authorities.

5. The method of claim 1 wherein:
   detecting the change to the topology of the storage system further comprises detecting that an amount of storage resources within the storage system has changed; and
   reconfiguring the storage system further comprises increasing or decreasing an amount of storage associated with one or more write groups.

6. The method of claim 1 wherein detecting the change to the topology of the storage system further comprises detecting that a utilization of a particular resource has reached a utilization threshold.

7. The method of claim 1 wherein an authority executing on compute resources within a first blade causes data to be stored on compute resources within a second blade.

8. An apparatus for dynamically configuring a storage system to facilitate independent scaling of resources, the apparatus including a computer processor and a computer memory, the computer memory including computer program instructions that, when executed by the computer processor, cause the apparatus to carry out the steps of:
   detecting a change to a topology of the storage system consisting of different sets of blades configured within one of a plurality of chassis, at least one blade of the different sets of blades having differing storage capacities, the change to the topology including a change in the number of blades in the storage system; and
   responsive to detecting the change to the topology of the storage system, reconfiguring the storage system to change an allocation of resources to one or more authorities without replicating any of the one or more authorities, each of the one or more authorities owning a segment of data, wherein the one or more authorities are configured to be identified through a hashing operation performed on the segment of data.

9. The apparatus of claim 8 further comprising computer program instructions that, when executed by the computer processor, cause the apparatus to carry out the step of:
   executing an authority on a first set of blades, the authority having control for a range of inode numbers; and
   wherein reconfiguring the storage system further comprises executing the authority on a second set of blades.

10. The apparatus of claim 8 further comprising computer program instructions that, when executed by the computer processor, cause the apparatus to carry out the step of:
   associating storage on a first set of blades with a write group; and
   wherein reconfiguring the storage system further comprises associating, in dependence upon a write group formation policy, storage on a second set of blades with the write group.

11. The apparatus of claim 8 wherein:
   detecting the change to the topology of the storage system further comprises detecting that an amount of processing resources within the storage system has changed; and
   reconfiguring the storage system farther comprises increasing or decreasing an amount of processing resources allocated to one or more authorities.

12. The apparatus of claim 8 wherein:
   detecting the change to the topology of the storage system further comprises detecting that an amount of storage resources within the storage system has changed; and
   reconfignring the storage system further comprises increasing or decreasing an amount of storage associated with one or more write groups.

13. The apparatus of claim 8 wherein detecting the change to the topology of the storage system further comprises detecting that a utilization of a particular resource has reached a utilization threshold.

14. The apparatus of claim 8 wherein an authority executing on compute resources within a first blade causes data to be stored on. compute resources within a second blade.

15. A computer program product for dynamically configuring a storage system to facilitate independent scaling of resources, the computer program product disposed on a non-transitory storage medium, the computer program product including computer program instructions that, when executed by a computer, cause the computer to carry out the steps of:
   detecting a change to a topology of the storage system consisting of different sets of blades configured within one of a plurality of chassis, at least one blade of the different sets of blades having differing storage capacities, the change to the topology including a change in the number of blades in the storage system; and
   responsive to detecting the change to the topology of the storage system, reconfiguring the storage system to change an allocation of resources to one or more authorities without replicating. any of the one or more authorities, each of the one or more authorities owning a segment of data, wherein the one or more authorities are configured to be identified through a hashing operation performed on the segment of data.

16. The computer program product of claim of 15 further comprising computer program instructions that, when executed by the computer, cause the computer to carry out the step of:
   executing an authority on a first set of blades, the authority having control for a range of inode numbers; and
   wherein reconfiguring the storage system further comprises executing the authority on a second set of blades.

17. The computer program product of claim of 15 further comprising computer program instructions that, when executed by the computer, cause the computer to carry out the step of:
   associating storage on a first set of blades with a write group; and
   wherein reconfiguring the storage system further comprises associating, in dependence upon a write group formation policy, storage on a second set of blades with the write group.

18. The computer program product of claim of 15 wherein:
   detecting the change to the topology of the storage system firther comprises detecting that an amount of processing resources within the storage system has changed; and
   reconfiguring the storage system further comprises increasing or decreasing an amount of processing resources allocated to one or more authorities.

19. The computer program product of claim of 15 wherein:
   detecting the change to the topology of the storage system further comprises detecting that an amount of storage resources within the storage system has changed; and
   reconfiguring the storage system further comprises increasing or decreasing an amount of storage associated with one or more write groups.

20. The computer program product of claim of 15 wherein detecting the change to the topology of the storage system further comprises detecting that a utilization of a particular resource has reached a utilization threshold.

* * * * *